Figure 1:
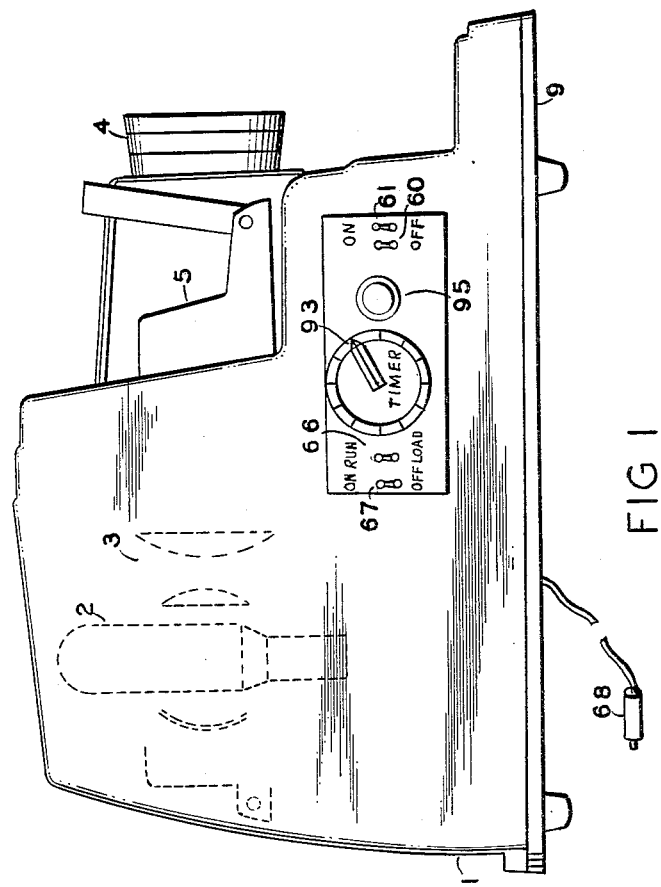

*INVENTOR.*
DAVID POLLAN
BY *James P. Malone*

United States Patent Office 3,015,251
Patented Jan. 2, 1962

3,015,251
POWERIZED AUTOMATIC SLIDE PROJECTOR
David Pollan, Jackson Heights, N.Y., assignor to Viewlex, Inc., Holbrook, N.Y.
Continuation of application Ser. No. 554,438, Dec. 21, 1955. This application Dec. 22, 1958, Ser. No. 782,217
2 Claims. (Cl. 88—28)

This invention relates to slide projectors adapted to receive a slide magazine, and more particularly to such means having smoothly adjustable motor means for changing the slides.

This application is a continuation of application Serial No. 554,438, filed December 21, 1955, now abandoned, of the same title, which is a continuation in part of my prior application Serial No. 552,428, filed December 12, 1955, for Automatic Slide Projector.

My prior application showed a manually operated magazine type projector. This application is a motorized version of my prior invention and includes smoothly variable timing means which have infinite variation within the desired limits for all practical purposes.

Prior slide projectors have generally been of the type adapted to receive a slide carrier into which the slides are inserted individually by hand. Adapters to handle slide magazines have also been built for use with these essentially manual type projectors. The use of slide magazines has become quite common, since they provide a very convenient way of storing and transporting the slides without any possibility of damage. These slide magazines are generally rectangular plastic members, having a series of partitions adapted to hold about thirty or more slides. The slide magazines are extremely convenient for cataloging and keeping the slides in the proper sequence. This is particularly important where a series of slides is prepared for a lecture. All that the lecturer need do is insert the slide in the projector and he is assured that the slides are in the proper sequence.

The adapters that have heretofore been used to adapt the manual type projectors for slide magazines have been rather bulky and inconvenient to handle, since they generally require a separate carrying case approximately as large as the projector itself.

The projector of the present invention incorporates the slide magazine track inside the projector housing, and, therefore, provides a much more compact and improved combination. The present invention also provides motor means for indexing the magazine forward and moving the slides. A smoothly adjustable timer means is also provided, having infinite variation between the desired limits for all practical purposes.

Accordingly, a principal object of the invention is to provide new and improved slide projector means.

Another object of the invention is to provide new and improved motorized slide projector means including means to accommodate a slide magazine.

Another object of the invention is to provide new and improved slide projector means including means to move the slides and slide magazine and means to automatically control the timing.

Another object of the invention is to provide new and improved slide projector means including slide changing motor means and means to provide infinite variation of the timing within the desirable limits.

Another object of the invention is to provide new and improved slide projector means including motorized slide changing means, timing means, means to adjust said timing means, and alternate pushbutton control means.

Figure 2:
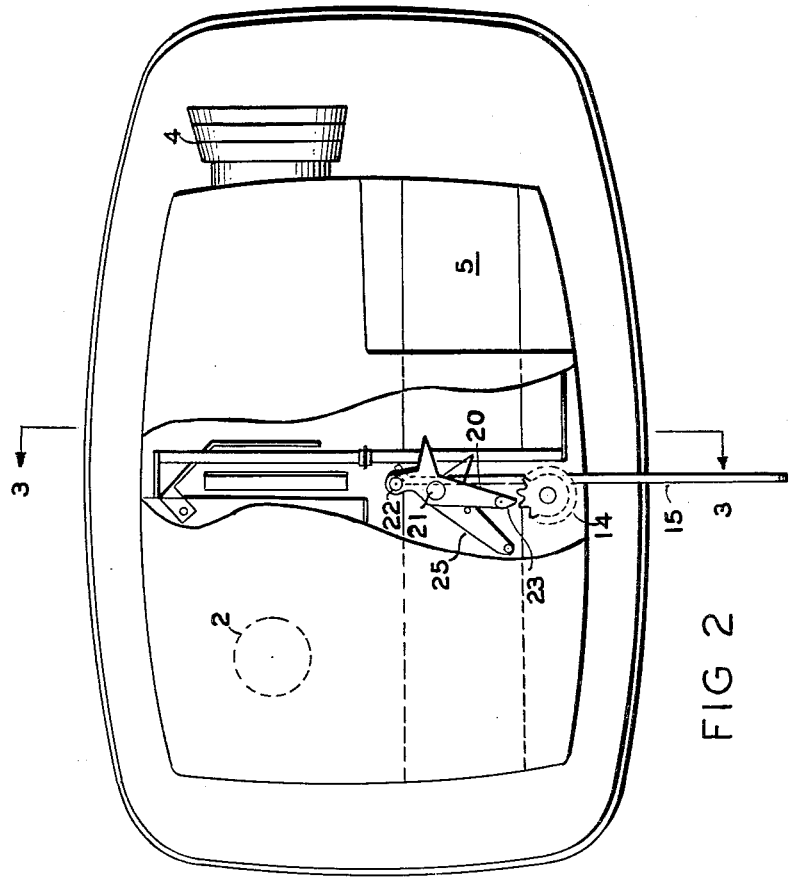
Figure 3:
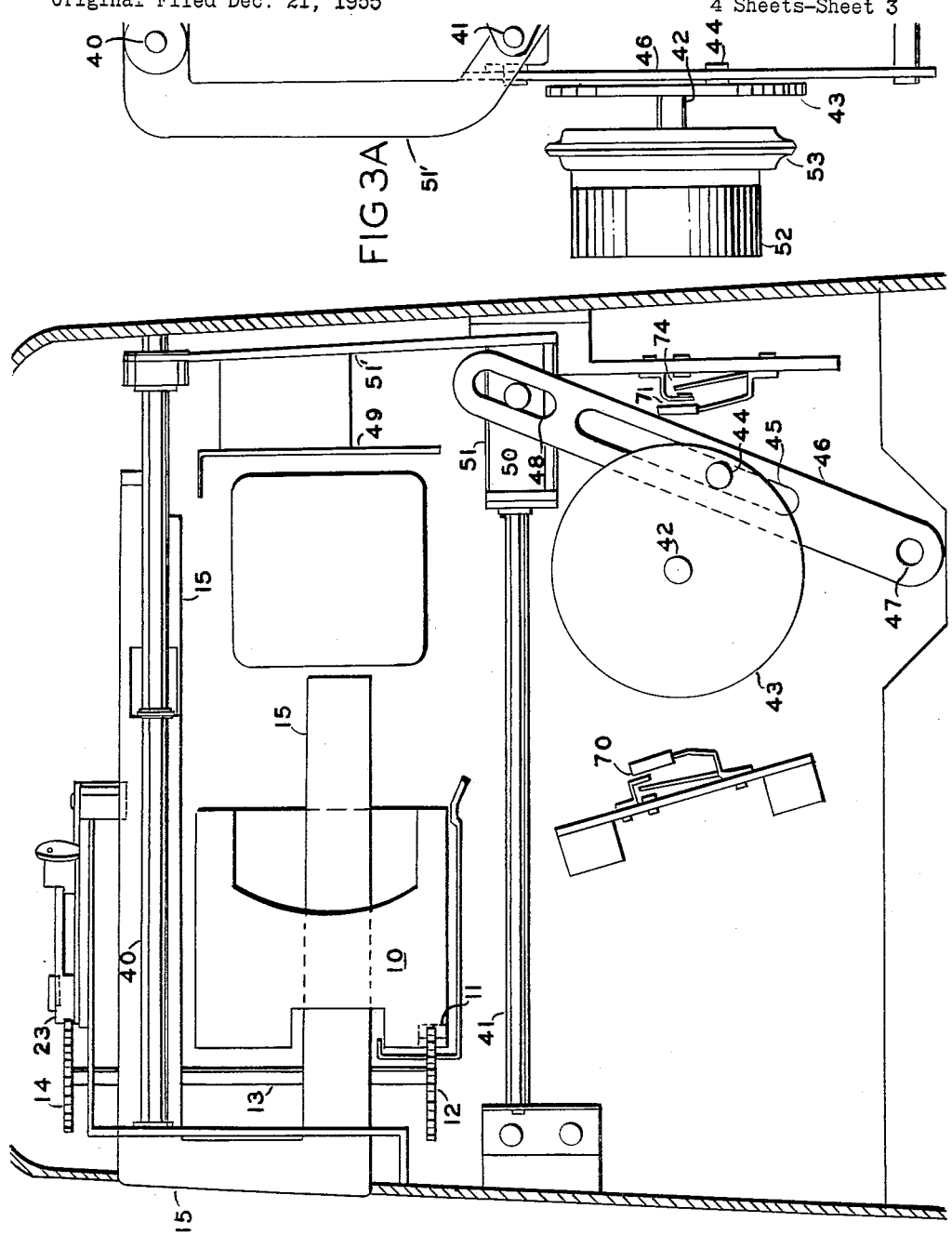
Figures 4, 5:
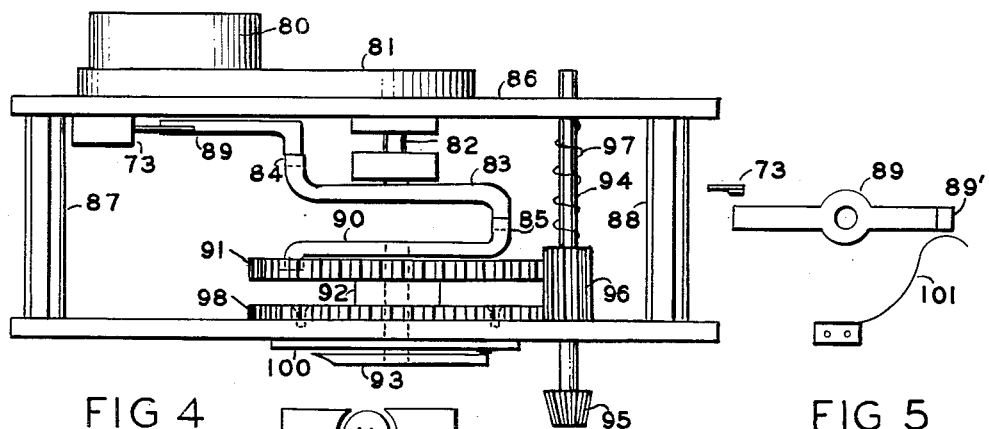
Figure 6:
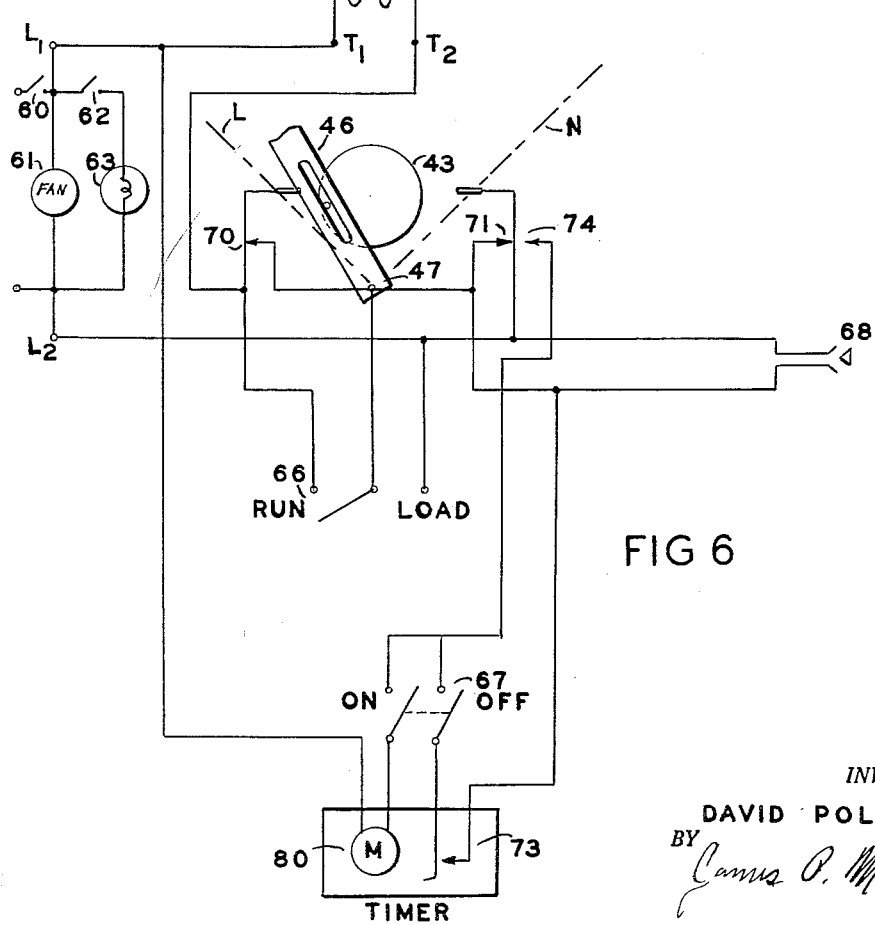

These and other objects of the invention will be apparent from the following specification and drawings, of which:

FIGURE 1 is a side view of an embodiment of the invention.
FIGURE 2 is a top view of the embodiment of FIGURE 1 partially cut away.
FIGURE 3 is a detail view along the line 3—3 of FIGURE 2.
FIGURE 3A is a side view of FIGURE 3.
FIGURES 4 and 5 are detail views of the timing means.
FIGURE 6 is a schematic circuit diagram.

Referring to FIGURES 1 and 2, the projector housing 1 is supported on a base member 9 and includes a projector lamp at 2, a lens system at 3 in front of the projector lamp, and a focusing lens at 4. On the other side of the projector, parallel to the optical path, is an internal slide magazine track 5 which extends the full length of the projector so that a slide magazine may be inserted through the back of the projector and removed from the front of the projector after it has been automatically advanced, as will be more fully described.

The slide magazine 10, FIGURE 3, is generally a conventional plastic container, having a number of partitions for holding about thirty slides, and it has a rack 11 molded into it, which fits an advancing gear 12, for indexing the slide magazine. The slide changing and magazine indexing means are shown generally in the cut out portion of FIGURE 2, and an elevation sectional view is shown in FIGURE 3.

Referring to FIGURE 3, the slide magazine 10 has a rack 11 which contacts the advancing gear 12, which is mounted on the shaft 13, which is preferably a square shaft for accurate indexing and adjusting. A gear 14, similar to gear 12, is mounted at the top of shaft 13 and this gear is adapted to be advanced by the slide changing pusher member 15 each time a slide is moved into viewing position. This action is accomplished through a pawl 23 and spring detent mechanism.

Referring to FIGURE 2, the pawl and detent advancing mechanism comprise an upper arm 20 and a lower arm 25, both pivotally mounted to the frame at 21. Arm 20 is energized by the pusher member 15 hitting roller 22 on the other end of arm 20.

The above mechanisms are described more fully in my above mentioned prior application.

The slide pusher member 15, is connected to the motive power as follows, referring to FIGURES 3 and 3A.

The slide pusher 15 and slide returning means 49 ride on two horizontal bars 40 and 41 and are connected to the motor shaft 42 by a sliding pin and bar linkage, as follows.

The motor shaft 42 is connected to a disc 43 which has a pin 44, which rides in a slot 45 of the bar 46, which is pivotally mounted on the frame at the point 47. The upper end of the bar 46 contains a slot 48 in which rides a pin 50, which is mounted on the slide moving bracket 51 51'.

Therefore, as the motor rotates the disc 43, the bar 46 will oscillate, thereby moving the slide pushing and returning means back and forth and at the same time indexing the slide magazine as previously described. The moving force is applied to the slide returning bracket 49 by means of the vertical connecting member 51'.

The slide moving motor 52, FIGURE 3A, is preferably of a type having a built-in clutch mechanism so that the inertia of the motor and gears will not cause any overrunning. The mechanism is essentially a "one revolution" or "one shot" device, since each slide is individually handled. If there was any overrunning, it might cause binding of the slides due to overtraveling of the magazine with the probability of jamming. The slide moving motor 52 is preferably of small size and high speed, which is geared down by a gear train 53 to provide enough power.

Conventional fractional horse-power shaded-pole clutch-gear motors are commercially available. It is preferable that the motor 52 be of the type having a sliding armature 54, which is pulled into engagement with the gears 53 by the main magnetic field of the motor, and the armature is preferably spring-loaded so that it will disengage the gears immediately when the power is shut off and will dissipate its inertia by spinning freely. A suitable motor for this application, which is commercially available, is manufactured by the Molon Motors and Coil Company, Chicago, Illinois.

Referring to FIGURE 6, the electrical control circuit is shown for the projector. Power is applied to terminals $L_1$ and $L_2$. The entire apparatus is energized by main switch 60, which applied energy to the fan motor 61 and to the control circuits. Switch 62 supplies energy to the projector lamp 63. The main components of the control circuit are the power motor 52, timing motor 65.

The following control switches are provided; a single pole double throw switch 66, which has "run" and "load" positions. The "load" position is used to clear the pusher member from the magazine track so that the magazine may be loaded into the projector. A timer "on-off" switch 67 is provided and a remote control push button switch 68 is also provided. The linkage arm 46 is pivotally mounted at 47 and adapted to open the left and right switches 70 and 71. The normal "viewing" position of the arm 46 is shown by the line "N." The arm 46 is actuated by a slide pin linkage driven by the motor as previously described. The fan 61 is connected across the terminals $L_1$ and $L_2$ through switch 60, and the projector lamp 63 is connected in parallel with the fan through switch 62. Motor terminal $T_1$ is connected to one side of the line $L_1$, the other motor terminal $T_2$ being connected to one side of switch 70 and also to "Run" terminal of switch 66 The other side of the switch 70 is connected to the center terminal of the switch 66 and also to one terminal of the switch 71. The other side of switch 71 is connected to $L_2$. Pushbutton switch 68 is connected in parallel with the switch 71. The "Load" terminal of switch 66 is also connected to $L_2$.

The timer comprises a motor driven switch 73 which is connected in a series connection with switch 67 and switch 74, this series connection being connected in parallel with the pushbutton switch 68.

*Manual pushbutton operation*

With the arm in normal position, the timing switch 67 "off" and the switch 66 in "run" position, when the pushbutton 68 is pushed, a circuit is completed from $L_2$ through the pushbutton 68 and switch 70 to the $T_2$ terminal of the motor 52. The $T_1$ terminal of the motor is directly connected to the other side of the line $L_1$. Therefore, the arm 46 will be driven from normal position through one complete revolution, as explained hereafter.

Note that switch 71 is in parallel with the pushbutton 68 so that as soon as the pushbutton is released, the arm 46 has moved enough to close switch 71 in parallel with the pushbutton. Also note that the "run" position of switch 66 is in parallel with switch 70, so that the switch 70 will only stop the arm 46 in the "load" position when the switch 66 is in "load" position "L." The motor will continue to operate until the arm 46 opens the switch 71, which will stop the apparatus in normal position after one complete cycle, which is also the "viewing" position. The view taken of arm 46 on FIGURE 6 is from the front of the projector.

*Load position*

When the switch 66 is put in "load" position, the circuit is completed from $L_2$ through the switch 66, through switch 70 to $T_2$ on the motor 64. The motor will, therefore, run until switch 70 is opened and will stop in "load" position. If the switch 66 is then turned to "run" position, the arm 46 will return to normal position, i.e., until switch 71 is opened.

*Automatic timer position*

Note that when switch 67 is in "timer on" position, the switch 73 of the timer, which is normally open, is connected in parallel with the pushbutton switch 68 through switch 74. When the arm 46 is in normal position, the switch 74 is closed. Therefore, each time the timer motor 65 actuates the switch 73, it has the same effect as pushing the pushbutton, namely, causing the arm 46 to go through one complete cycle, which will be stopped when the switch 71 is again opened.

The timing mechanism comprises a synchronous motor 80 of the type shown in Patent No. 1,976,880, No. 2,436,-231, or No. 2,492,197. Motors of this type are so constructed that they start in either direction depending upon the direction of current flow. In other words, depending upon which half of the alternating current cycle during which it is started.

If the motor is at any time stopped against motion in one direction, it will start to turn in the opposite direction as soon as the alternating current cycle is reached, which will urge it in the opposite direction. Once the motor is started it will continue to run in one direction.

By utilizing one of these motors, and a pair of stops which may be set with smoothly adjustable variations, any desired timing cycle may be achieved. In order to achieve infinite variation of the timing adjustment within the limits of desirable frequencies, the adjustable stop is preferably positioned by a spring-loaded or friction-loaded knob against a calibrated dial. The use of spring-loading or friction-loading is to decelerate the motor without shock and give it an initial spring return push in the opposite direction.

Referring to FIGURES 4 and 5, the timing motor 80 is a synchronous motor of the type in the above mentioned patents. The motor may be quite small and its output is connected to a gear train 81 having an output shaft 82, upon which is mounted an arm 83 having projections 84 and 85 at its ends. The whole assembly thus far described is mounted on a mounting plate 86, which is mounted on the frame 1 by bolts on the spacer members 87 and 88. A fixed position spring-loaded stop 89 is mounted on the plate 86 and adapted to engage the projection 84 of the arm 83.

The variable position adjustable stop 90 is also a spring-loaded stop like stop 89 and it is mounted on a gear 91, which is fixed to a shaft 92, which has a time indicating pointer 93 at its end.

The locking and setting means for setting the variable stop comprises a shaft 94 having a setting knob 95 at one end and a gear 96, which is adapted to engage the gear 91. The shaft assembly is spring-loaded by the spring 97. A locking gear 98 is permanently affixed to the frame 1 behind the indicating dial 100.

The variable stop 90 is adjusted by pushing in the knob 95 and turning the variable stop through the gears 91 and 96. When the knob 95 is released, the spring 97 will push the gear 96 into engagement with the fixed gear 98, therefore, locking the two gears 91 and 98 and also locking the variable stop 90.

FIGURE 5 shows a detailed view of an embodiment of the variable stops 89 and 90, which may be similar. The stop comprises an arm 89, which is pivotally mounted on a supporting structure either plate 86 or the shaft 92. The arm 89 has a projecting portion 89', and a spring 101 is mounted behind the projecting portion 89'. Therefore, when the arm 89 is hit by the projection 84 of the motor driven arm 83, it will actuate the switch 73, which is in parallel with pushbutton 68 and contact the spring 101, which will stop the motor, which will then reverse and the spring 101, upon returning to its normal position, will give the motor an initial push. Therefore, the motor will be smoothly decelerated and accelerated in the opposite direction.

By properly choosing the gear ratios in connection with the motor speed, a desirable range of variation in the timing of the slide changing frequency may be obtained with a smoothly adjustable variation. The variation found preferable for slide viewers in one embodiment is from a two second period to a forty second period, which would cover the normal requirements. If longer viewing time is desired, the apparatus can be switched to pushbutton operation.

I claim:

1. Control means for a power driven removable magazine slide projector of the type wherein the magazine moves linearly parallel the optical axis of said projector comprising a uni-directional motor; means connected to said motor to horizontally move said slides to and from said magazine; said slide moving means comprising a horizontally slidable push and return member mounted in said projector adapted to extend through said magazine to push a slide; a rotary to reciprocating motion converting linkage connecting said slidable member to said motor; and electrical circuit means comprising first and second switches positioned to be actuated by said linkage at each end of its reciprocating cycle; said first switch being connected and adapted to stop said push and return member in an inner viewing position; and said second switch being connected and adapted to stop said push and return member in an outer load position so that said push and return member will not interfere with axial movement of said magazine; said switches being connected in series with each other, said motor, and a source of power; a manual pushbutton switch being connected in parallel with said first switch, a control switch means having run and load positions, said control switch means being connected in the circuit so as to short circuit said second switch when in the run position and to short circuit said first switch and said manual pushbutton switch when in the load position.

2. Control means for a power driven removable magazine slide projector of the type wherein the magazine moves linearly parallel the optical axis of said projector comprising a uni-directional motor; means connected to said motor to horizontally move said slides to and from said magazine; said slide moving means comprising a horizontally slidable push and return member mounted in said projector adapted to extend through said magazine to push a slide; a pin and pivoted bar linkage connecting said slidable member to said motor; and electrical circuit means comprising first and second switches positioned to be actuated by said pivoted bar at each end of its cycle; said first switch being connected and adapted to stop said push and return member in an inner viewing position; and said second switch being connected and adapted to stop said push and return member in an outer load position so that said push and return member will not interfere with axial movement of said magazine; said switches being connected in series with each other, said motor, and a source of power; a manual pushbutton switch being connected in parallel with said first switch, and a single pole double throw switch having run and load positions, said switch being connected in the circuit so as to short circuit said second switch when in the run position and to short circuit said first switch and said manual pushbutton switch when in the load position.

References Cited in the file of this patent

UNITED STATES PATENTS

| | | |
|---|---|---|
| 2,146,452 | Spindler | Feb. 7, 1939 |
| 2,537,429 | Seyler | Jan. 9, 1951 |
| 2,732,758 | Waller | Jan. 31, 1956 |
| 2,756,630 | Goldberg | July 31, 1956 |
| 2,843,951 | Richards | July 22, 1958 |
| 2,907,128 | Norton | Oct. 6, 1959 |